United States Patent Office 3,487,157
Patented Dec. 30, 1969

---

3,487,157
NOVEL N-SUBSTITUTED AZIRIDINE COMPOSITIONS AND METHOD FOR COMBATING MICROORGANISMS THEREWITH
Arleen Pierce, New Brunswick, N.J., assignor to Allied Chemical Corporation, New York, N.Y., a corporation of New York
No Drawing. Filed Oct. 31, 1966, Ser. No. 591,035
Int. Cl. A01n 9/22
U.S. Cl. 424—244                                    18 Claims

ABSTRACT OF THE DISCLOSURE

The method for combating microorganisms, especially bacteria, which comprises treating the same with an effective amount of an N-substituted aziridine.

---

This invention relates to a method for combating microorganisms, especially bacteria, and, in a preferred embodiment relates to a method of combating microorganisms by treating them with a chemical agent in vapor phase.

The problem of combating microorganisms, meaning in the context of this discussion killing and preventing or retarding the propagation of microorganisms, is common to a number of industries such as the food, agricultural and pharmaceutical industries, and is particularly significant to the medical profession. The usual methods of sterilization such as steam, heat, chemical solution, radiation, and the like, are impractical when large areas such as hospital rooms, laboratories and animal quarters are desired to be sterilized or when it is desired to sterilize delicate laboratory and medical equipment, which may contain plastics, fabrics, and the like, that may be adversely affected by moisture and heat.

The term sterilization is generally interpreted as referring to a condition in which a body or locus is freed from all living microorganisms as opposed to being freed only from certain microorganisms.

The problem of freeing a body from all living microorganisms is no mean one because, although many varities of microorganisms are relatively easy to combat, others have particularly high resistances to adverse conditions and are exceedingly difficult to combat. Such a microorganism is the bacteria *Staphylococcus aureus*. Unfortunately, such bacteria are commonly found in hospitals and food and are responsible for a large number of human fatalities every year. Because *Staphylococcus aureus* cells are so difficult to combat in comparison with other microorganisms, researchers have used these cells as standards for sterilization tests. It is preseumed that, if a given chemical agent is effective in combating *Staphylococcus aureus* cells, it will be effective in combating other varieties of vegetative cells. The converse of this is, of course, not true. Experience has proved this to be the case. An illustrative standard test that is widely used is the so-called F.D.A. Method (Food and Drug Administration Method) as published by Ruehle and Brewer in 1931. (See Porter, Bacterial Chemistry and Physiology, John Wiley & Sons, Inc., N.Y. (1946), p. 226.) This method requires tests of disinfectant or antiseptic action to be carried out against strains of *Staphylococcus aureus*.

The problem of sterilizing large areas and of sterilizing heat- or water-sensitive materials has been alleviated by the use of antimicrobic agents in vapor phase. Effective vapor phase antimicrobic agents must be capable of being readily introduced into the vicinity of the area to be treated; of rapidly and thoroughly penetrating porous surfaces in the area; of effectively penetrating, while in vapor phase, the microorganisms to be treated; of destroying the microorganisms over a wide range of temperatures and humidities; and of permitting ready removal by aeration. Unfortunately, many chemical agents, while possessing good antimicrobic activity, are not capable of functioning effectively in vapor phase for lack of one or more of the above-noted requirements. Bactericidal agents, for example, which have high vapor pressures and may be vaporized easily, may still not possess the penetrability properties required for effective vapor phase use.

It is a major object of this invention to provide a novel method for combating microorganisms such as bacteria, fungi, and the like.

It is another object of the invention to provide a novel method for effectively combating microorganisms such as bacteria, fungi and the like over a wide range of relative humidity conditions.

Yet another object of the invention is to provide a novel sterilization method.

It is a more particular object of the invention to provide a novel method for combating bacteria.

A still more specific object of the invention is to provide a novel method for combating *Staphylococcus aureus* cells.

A preferred object of the invention is to provide a novel method for combating microorganisms, particularly bacteria, comprising treating them with a chemical agent in vapor phase.

The preferred, most specific object of the invention is to provide a novel method for combating *Staphylococcus aureus* cells by treating them with a chemical agent in vapor phase.

It has been found that the above stated objects of the invention are accomplished by treating microorganisms with an N-substituted aziridine of the formula:

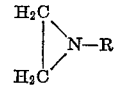

wherein R is a radical selected from the group consisting of—$CH_2CH_2CN$, —$CH_2CH_2OH$ and

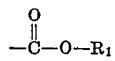

wherein $R_1$ is a straight or branched chain alkyl radical preferably containing from 1–4 carbon atoms inclusive. Mixtures of any of the compounds embraced by the above formula may also be employed. One subclass of N-substituted aziridines, as described above, are those in which R is a radical selected from the group consisting of —$CH_2CH_2CN$ and —$CH_2CH_2OH$. Another subclass of N-substituted aziridines within the scope of the invention are those in which R is a radical selected from the group consisting of —$CH_2CH_2CN$ and

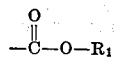

wherein $R_1$ is as defined above. Still another subclass of N-substituted aziridines within the scope of the invention are those in which R is a radical selected from the group consisting of $CH_2CH_2OH$ and

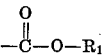

wherein $R_1$ is as defined above. The novel antimicrobic agents of the invention will be referred to hereafter as "the subject aziridines." In accordance with the preferred objects of the invention, the subject aziridines may be used effectively in vapor phase.

The subject aziridines belong to known classes of compounds and may be prepared by standard and well known techniques. The subject aziridine in which R is a —$CH_2CH_2CN$ radical, i.e. N-(2-cyanoethyl)aziridine, may be prepared by the addition of cyanoethylene to aziridine. The subject aziridine wherein R is a —$CH_2CH_2OH$ radical, i.e., N-(2-hydroxyethyl)aziridine, may be prepared by the addition of ethylene oxide to aziridine. The subject aziridines wherein R is a $$-\overset{O}{\underset{\|}{C}}-O-R_1$$

radical, wherein $R_1$ is as defined above, i.e. alkyl aziridinyl formates, may be prepared by the addition of alkyl chloroformates to aziridine. The above type addition reactions are described in a number of standard texts, such as Weissberger, The Chemistry of Heterocyclic Compounds, Interscience Publishers, N.Y. (1964), Part One, pp. 542–546. Illustrative of the N-substituted aziridines within the scope of the invention are the following:

N-(2-cyanoethyl)aziridine
N-(2-hydroxyethyl)aziridine
methyl aziridinyl formate
ethyl aziridinyl formate
isopropyl aziridinyl formate
n-butyl aziridinyl formate
sec-butyl aziridinyl formate The subject aziridines may be used to treat microorganisms by contacting the microorganisms to be treated, or surfaces containing the same, with the subject aziridines in the form of solutions, sprays, mists, dusts, or in accordance with the preferred embodiments, in vaporous state. The subject aziridines may be used alone or in admixture with vaporous, solid, or liquid diluents such as air and water or hydrocarbon liquids, with or without any of the well known anionic, cationic or nonionic surface-active wetting agents. Such agents include, for example, alkali metal salts of higher fatty acids, water-soluble salts of sulfated higher fatty alcohols, water-soluble aryl sulfonates, and quaternary ammonium bases such as trialkyl benzyl ammonium chloride. In the preferred vapor phase embodiment, a subject aziridine may be conveniently employed such as by vaporizing it in a closed area in which the microorganism-containing surfaces to be treated are located or by using a vaporous diluent such as air which may be bubbled into the liquid aziridine and then the aziridine-laden air used to fumigate a closed space surrounding the microorganism-containing surfaces to be treated.

As is well known in this are, dosages of a given antimicrobic agent can vary widely depending upon the particular organism to be controlled, the area of the locus to be treated, the time in which control is desired to be established, and environmental conditions such as temperature, relative humidity, etc. In any event, sufficient concentrations of the subject aziridines should be utilized in order to effectively combat the microorganisms to be treated, that is to say, in order to maximize the killing of existing living bacteria and the prevention of propagation of the same in the same locus for a significant period of time. The dosages that will be required in a particular case to accomplish these ends are readily ascertainable and are thus within the skill of the art.

The subject aziridines can be employed as the sole active ingredient in combating microorganisms; however, if desired, they can be combined with active materials such as other antimicrobic agents or growth inhibitors to achieve special results or with nonactive components such as perfumes, propellant aids, and the like.

EXAMPLES 1–6

One-tenth ml. portions of aziridine test materials were charged to one-liter flasks. Circular patches of cotton cloth, each having an area of about 2 $cm.^2$ and each impregnated with an aqueous suspension of about $5 \times 10^6$ *Staphylococcus aureus* cells and subsequently dried, were suspended by wires about halfway down into the flasks. The flasks were stoppered and the patches containing the bacteria were exposed to the subject aziridine vapor for periods of 1, 4 and 24 hours. The exposures were conducted at room temperature (about 20–31° C). and were duplicated in atmospheres of 50% and 90% relative humidity. Relative humidities in the bottles were elevated by flushing with air passed through water. At the end of the exposure periods, the patches were removed and assayed for viable organisms by the pour-plate method as follows: The patches were placed in dilution blanks composed of aqueous solutions of 0.1% lecithin v./v. and 0.71% Tween 80 (trademark of Atlas Powder Co. for an emulsifier comprising a polyoxyalkylene derivative of sorbitan monooleate) v./v. and adjusted to pH 7 with 1 N NaOH. Organisms remaining on the patches were dislodged by shaking and aliquots were plated in enriched nutrient agar. After incubating for 48 hours at 37° C., the percentage of organisms killed (attributable to the action of the subject aziridine test material) was calculated by comparison of the number found after testing with an assay of unexposed contaminant patches. Bacteria counts were made with a Quebec Colony counter. Average results of the above described tests are shown in the following table:

TABLE I

| Ex. | Test Compound | Relative Humidity | Percent of Bacteria Cells Killed | | |
|---|---|---|---|---|---|
| | | | 1 Hr. | 4 Hrs. | 24 Hrs. |
| 1 | N-(2-cyanoethyl) aziridine. | 50 | | | 99+ |
| 2 | do | 90 | | | 99+ |
| 3 | N-(2-hydroxyethyl) aziridine. | 50 | 97.3 | 99.3 | 100 |
| 4 | do | 90 | 99.9 | | 100 |
| 5 | Ethyl aziridinyl formate. | 50 | | | 99+ |
| 6 | do | 90 | | | 99+ |

EXAMPLES 7–8

The test procedure of Examples 1–6 was followed using *Bacillus globigii* spores as the test bacteria and ethyl aziridinyl formate vapors as the test compound. The results are reported in Table II.

TABLE II

| Example | Relative Humidity | Percent of Bacteria Cells Killed | | |
|---|---|---|---|---|
| | | 1 Hr. | 4 Hrs. | 24 Hrs. |
| 7 | 50 | | | 98+ |
| 8 | 90 | | 99+ | |

I claim:
1. The method for combating bacteria and fungi-microorganisms which comprises treating said microorganisms with an effective amount of an N-substituted aziridine of the formula:

$$\begin{array}{c} HC \\ | \phantom{xx} \diagdown \\ | \phantom{xxxx} N-R \\ | \phantom{xx} \diagup \\ H_2C \end{array}$$

wherein R is a radical selected from the group consisting of —$CH_2CH_2CN$, —$CH_2CH_2OH$ and $$-\overset{O}{\underset{\|}{C}}-O-R_1$$

wherein $R_1$ is an alkyl group of 1–4 carbon atoms and mixtures thereof.

2. The method of claim 1 in which R is a radical selected from the group consisting of —$CH_2CH_2CN$ and $CH_2CH_2OH$.

3. The method of claim 1 in which R is a radical selected from the group consisting of —$CH_2CH_2CN$ and $$-\overset{O}{\underset{\|}{C}}-O-R_1$$

4. The method of claim 1 in which R is a radical selected from the group consisting of —CH₂CH₂CN and

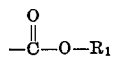

5. The method of claim 1 in which R is a radical selected from the group consisting of CH₂CH₂OH and

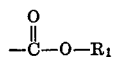

6. The method of claim 1 in which R is a radical selected from the group consisting of —CH₂CH₂OH and

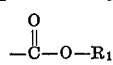

7. The method of claim 1 in which the N-substituted aziridine is employed in vapor phase.

8. The method of claim 1 in which the microorganisms treated are bacteria.

9. The method of claim 1 in which the microorganisms treated are *Staphylococcus aureus* cells.

10. The method of claim 1 in which the microorganisms treated are *Bacillus globigii* spores.

11. The method of claim 1 in which the N-substituted aziridine is ethyl aziridinyl formate and in which such material is employed in vapor phase.

12. The method of claim 1 in which the N-substituted aziridine is N-(2-hydroxyethyl)aziridine and in which such material is employed in vapor phase.

13. The method of claim 1 in which the N-substituted aziridine is ethyl aziridinyl formate and in which such material is employed in vapor phase.

14. A bactericidal and fungicidal composition comprising as active ingredient an effective amount of an N-substituted aziridine of the formula:

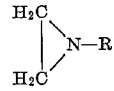

wherein R is a radical selected from the group consisting of —CH₂CH₂CN, —CH₂CH₂OH and

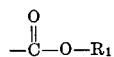

wherein R₁ is an alkyl group of 1–4 carbon atoms and mixtures thereof, together with a diluent therefor.

15. A composition according to claim 14 which contains a bactericidally effective amount of the active ingredient.

16. A composition according to claim 14 in which the active ingredient is N-(2-cyanoethyl)aziridine.

17. A composition according to claim 14 in which the active ingredient is N-(2-hydroxyethyl)aziridine.

18. A composition according to claim 14 in which the active ingredient is ethyl aziridinyl formate.

References Cited

UNITED STATES PATENTS

| | | | |
|---|---|---|---|
| 3,146,228 | 8/1964 | Chance | 260—239 |
| 3,208,905 | 9/1965 | Ristich et al. | 167—33 |

ALBERT T. MEYERS, Primary Examiner

D. M. STEPHENS, Assistant Examiner

UNITED STATES PATENT OFFICE
CERTIFICATE OF CORRECTION

Patent No. 3,487,157                Dated December 30, 1969

Inventor(s) Arleen C. Pierce

It is certified that error appears in the above-identified patent and that said Letters Patent are hereby corrected as shown below:

Column 1, line 43, "varities" should be --varieties--.

Column 1, line 53, "preseumed" should be --presumed--.

Column 3, line 47, "are" should be --art--.

Claim 1, column 4, line 56, "HC" should be --$H_2C$--.

Claim 11, column 5, line 25, "ethyl aziridinyl formate" should be --N-(2-cyanoethyl)aziridine--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents